(12) United States Patent
Rau

(10) Patent No.: US 6,428,645 B1
(45) Date of Patent: Aug. 6, 2002

(54) VEHICULAR MOUNT ASSEMBLY WITH BONDED RUBBER

(75) Inventor: Thomas Edward Rau, Dayton, OH (US)

(73) Assignee: Delphi Technologies, Inc., Troy, MI (US)

(*) Notice: Subject to any disclaimer, the term of this patent is extended or adjusted under 35 U.S.C. 154(b) by 648 days.

(21) Appl. No.: 08/867,617

(22) Filed: Jun. 2, 1997

(51) Int. Cl.⁷ .............................................. B32B 31/00
(52) U.S. Cl. ..................... 156/151; 156/281; 156/307.5; 156/316; 428/416
(58) Field of Search ................................ 156/316, 151, 156/281, 307.5

(56) References Cited

U.S. PATENT DOCUMENTS

| | | | | |
|---|---|---|---|---|
| 2,657,162 A | * | 10/1953 | Tibenham | ................... 156/316 |
| 3,586,568 A | * | 6/1971 | Campbell | ................... 156/316 |
| 3,802,989 A | * | 4/1974 | Huber et al. | ............. 156/307.5 |
| 4,544,432 A | | 10/1985 | Foister et al. | |
| 4,889,578 A | * | 12/1989 | Kei et al. | ................... 156/316 |
| 4,987,679 A | | 1/1991 | Rau | |
| 5,031,873 A | | 7/1991 | Rau | |

* cited by examiner

Primary Examiner—John J. Gallagher
(74) Attorney, Agent, or Firm—Robert M. Sigler

(57) ABSTRACT

A method of forming a bond between a resilient rubber member with a chlorinated surface and a bracket, especially in a vehicle mount assembly, includes forming a cured epoxy coating on the bracket member and heating the bracket member and the chlorinated surface of the rubber body to a bonding temperature while pressing them together to form a bond between them.

7 Claims, 2 Drawing Sheets

VEHICULAR MOUNT ASSEMBLY WITH BONDED RUBBER

TECHNICAL FIELD

This invention pertains to vehicular mounting or cushioning assemblies involving a resilient rubber or elastomeric body that is adhesively bonded to a bracket or containment member.

BACKGROUND OF THE INVENTION

There are several applications in automobile technology in which a cushioning or mounting member is employed to support an engine or a transmission to body members or to provide a cushioned connection (e.g., a bushing) between suspension members. A typical engine mount or transmission mount, for example, employs a resilient body of polyisoprene rubber, or such rubber mixed with other suitable elastomer material, sandwiched, sometimes under pressure, between cooperating bracket members. One of the bracket members is connected to the engine or to the transmission, and another bracket member is attached to a vehicle body member. In addition to being sandwiched and sometimes compressed between the bracket members, the rubber or other elastomer is adhesively bonded to the brackets.

The bonding requirement in such an application can vary from structural to nonstructural. In structural bonding, where the bond is expected to sustain a substantial load, the bond is considered successful if the entire bracket or substrate is covered with torn rubber after failure of the test specimen. In nonstructural bonding, the rubber-bracket interface is not subjected to large tensile or shear loads. It is only necessary to keep the rubber in intimate contact with the bracket. The bracket is usually, but not necessarily always, steel or aluminum.

The techniques employed for such rubber bonding are divided naturally depending on whether the bond is made while the rubber cures, in situ bonding, or after cure, post-vulcanization bonding. In situ bonding is the accepted method for the manufacture of many natural or synthetic polyisoprene rubber bonded articles such as mounting devices where a rigid insert, commonly a steel tube, is substantially surrounded by a body of rubber. An adhesive is first coated on the rigid insert from a solvent or water carrier and then dried. The insert is then placed like a core member in the rubber mold prior to injection of the uncured rubber. Adhesive cure takes place during the rubber curing process. Examples of suitable adhesives for in situ or pre-vulcanization are the reactive elastomeric products sold under the trade names of Chemlok™ and Thixon™, respectively, by Lord Corporation and Morton International in the United States. Such in situ bonds are usually stronger than post-vulcanization bonds.

A number of techniques are used for post-vulcanization bonding. A most common practice utilizes the same type of reactive elastomeric adhesive used for in situ bonding. In this case, the cured rubber mass is held in contact with the adhesive coated surface and heated. Substantial pressure is required, often requiring the rubber to be compressed by about 20% of its original height. This method is particularly attractive for products such as bonded bushings where a cylindrical mass of rubber is compressed within an annular outer shell. The pressure requirement is easily met by the rubber being captured within the outer shell.

The use of epoxy resin in the manufacture of vehicular powertrain mounts was taught as an alternative to reactive elastomeric adhesives for post-vulcanization bonding in U.S. Pat. Nos. 4,987,679 and 5,031,873, assigned to the assignee of this invention. This process utilizes a two-component epoxy adhesive to bond cured rubber to rigid inserts. The primary advantage of the epoxy adhesive over conventional post-vulcanization bonding using reactive elastomeric adhesives is that pressure is not required to achieve good bonds. Also, a fair amount of mismatch between the rubber and the rigid insert can be tolerated since the mixed but uncured epoxy is mobile and fills gaps and still bonds well. This technology has made it attractive to convert designs that would otherwise be bonded in situ. It is not necessarily attractive for applications such as bushings where the rubber mass must be pushed into a constrictive shell. The uncured epoxy on the bond surface of the shell tends to be wiped out during rubber insertion, resulting in weak bonds.

Several production powertrain mounts are currently manufactured utilizing such two-part epoxy adhesives. In these applications, an electrophoretically-deposited cathodic resin is used on the surfaces of the metal bracket for the dual purpose of providing a primer for the epoxy adhesive as well as providing required corrosion protection in areas not bonded. The cathodic primer is usually applied over a zinc phosphate coating (actually a mixed zinc-iron phosphate) integral with the surface of the steel bracket.

The cathodic, electrophoretically-deposited coat is actually a single epoxy resin component paint which is electrolytically deposited from an aqueous bath. After the coating application or electroplating of the cathodic electrophoretic epoxy paint, the coated metal parts are cured at temperatures of 350° F. to 450° F. to convert the epoxy coating into a tough chemical and environmentally-resistant coating. In other words, the coating is cured or crosslinked. Such coatings are now used widely in the production of automotive bodies where the entire body is dipped into a tank and primed as a unit. Exemplary electrophoretically-applied epoxy paints are manufactured and sold by companies such as PPG under trade names such as Powercron 500™ and Powercron 640™. Electrophoretically-deposited epoxy paints are baked after application at temperatures of the order of 400° F. until they are cured. In their baked condition, they are scratch resistant and resistant to solvents such as gasoline or automobile oils. In the case of body parts, uncured paints are sprayed onto the primed surface and later baked to dry the paints. In the case of the above-mentioned engine or transmission mount applications (i.e., the '679 and '873 patent disclosures), a two-part epoxy adhesive is applied on top of the epoxy prime coat for the purpose of bonding the rubber-cushion body to the primed metal surface.

It is, of course, always of interest to simplify and render less complicated and expensive the practice of bonding a cured rubber body to a support bracket in a vehicle mount application and in other applications.

SUMMARY OF THE INVENTION

This invention is based on the discovery that it is possible to eliminate the epoxy adhesive as described in the above '679 and '873 patents and bond vulcanized polyisoprene rubber directly to a baked electrophoretically-applied epoxy prime coat material. In a more general statement of the invention, it has been found that it is possible by application of suitable pressure and heat to bond cured rubber containing 40% by weight or more natural or synthetic polyisoprene to a baked or cured epoxy resin-coated mounting device surface. This results in an excellent bond between the bulk elastomer and a bracket member which is capable of sustaining the loads that are common in vehicle mount applications and the like.

A preferred application of the invention is the bonding of natural rubber to an electrophoretically-applied epoxy resin prime-coated bracket. After the prime-coated bracket has been baked, for example, at a temperature of 350° F. to 450° F., to convert the coating into a tough, chemical- and environmentally-resistant coating, the bracket is ready to serve as a bonding surface for the resilient natural rubber body. The surface of the rubber body is chlorinated by immersing the bulk rubber in, for example, an aqueous solution of acidified sodium hypochlorite. The chlorinated surface rubber body is then pressed against the baked epoxy prime coat and the assembly heated to a temperature of the order of 250° F. to 350° F. for 15 minutes or so to form a strong bond between the chlorinated natural rubber surface and the epoxy prime coat.

As will be discussed below, this practice may be utilized with other suitable bulk resilient polyisoprene-containing elastomeric bodies and other suitable pre-cured epoxy paint coatings. Examples of such other paints include the electrostatically applied powder epoxy paints and other one-component (as opposed to two component adhesives) epoxy paint, or paint-like, resins. However, the common, surprising and inventive feature is that such elastomeric bodies can be urged under pressure against such cured epoxy resin surfaces and heated to a suitable elevated temperature for the purpose of effecting a strong bond between the epoxy-coated bracket and the bulk resilient elastomeric body.

A remarkable aspect of this invention is that a strong bond is obtained between a suitable bulk resilient rubber-containing body and a cured epoxy resin paint. For example, baked electrophoretically-applied prime coats (E-coat) typically exceed a 2H minimum hardness level in the ASTM D3363-92A Pencil Hardness test and a minimum of 60 inch/lbs in the ASTM D2794 Direct Impact test. Moreover, some users of Powercron 500 subject that baked E-coat paint to a solvent rub test. A suitably baked and cured Powercron 500 coating is required to withstand 50 back and forth rubs of a rag wetted with methyl ethyl ketone with no softening, marring or transfer of the paint to the rag. Baked E-coat paint films displaying such properties or characteristics would seem to be fully cured or crosslinked, and yet they participate in strong adhesive bond formation with a natural rubber body as described above.

Obviously, if a strong adhesive bond can be formed between a rubber body and a thus-cured epoxy paint layer, strong bonds can also be formed with one-component epoxy paint or other epoxy resin layers in a lower cure condition. Since the degree of cure of a generally solid, immobile one-component paint film is not easy to quantify, this invention is not limited by a state of cure reflected by the above hardness level, impact resistance and solvent resistance. In general terms, this invention does include the formation of an adhesive bond in a vehicle mount between a resilient elastomeric body and an epoxy resin layer that is substantially immobile at normal room temperature and thus apparently cured.

This practice finds useful application in the manufacture of transmission mounts, engine mounts or bushings, suspension mounts and bushings and other like vehicle mounting structures in which a bulk elastomeric body is sandwiched between two brackets, typically (but not necessarily) steel or aluminum brackets, and bonded to a cured one component epoxy resin paint coating on the bracket. The method is suitably applicable, for example, to natural and synthetic polyisoprene rubber, neoprene rubber and mixtures of 40 weight percent or more of such rubbers with other synthetic elastomers such as styrene acrylonitrile rubber, styrene isoprene rubber and the like.

Other objects and advantages of the invention will become more apparent from a detailed description thereof which follows.

BRIEF DESCRIPTION OF THE DRAWINGS

Reference will be had to the drawings in which.

DESCRIPTION OF PREFERRED EMBODIMENTS

Figure 1:
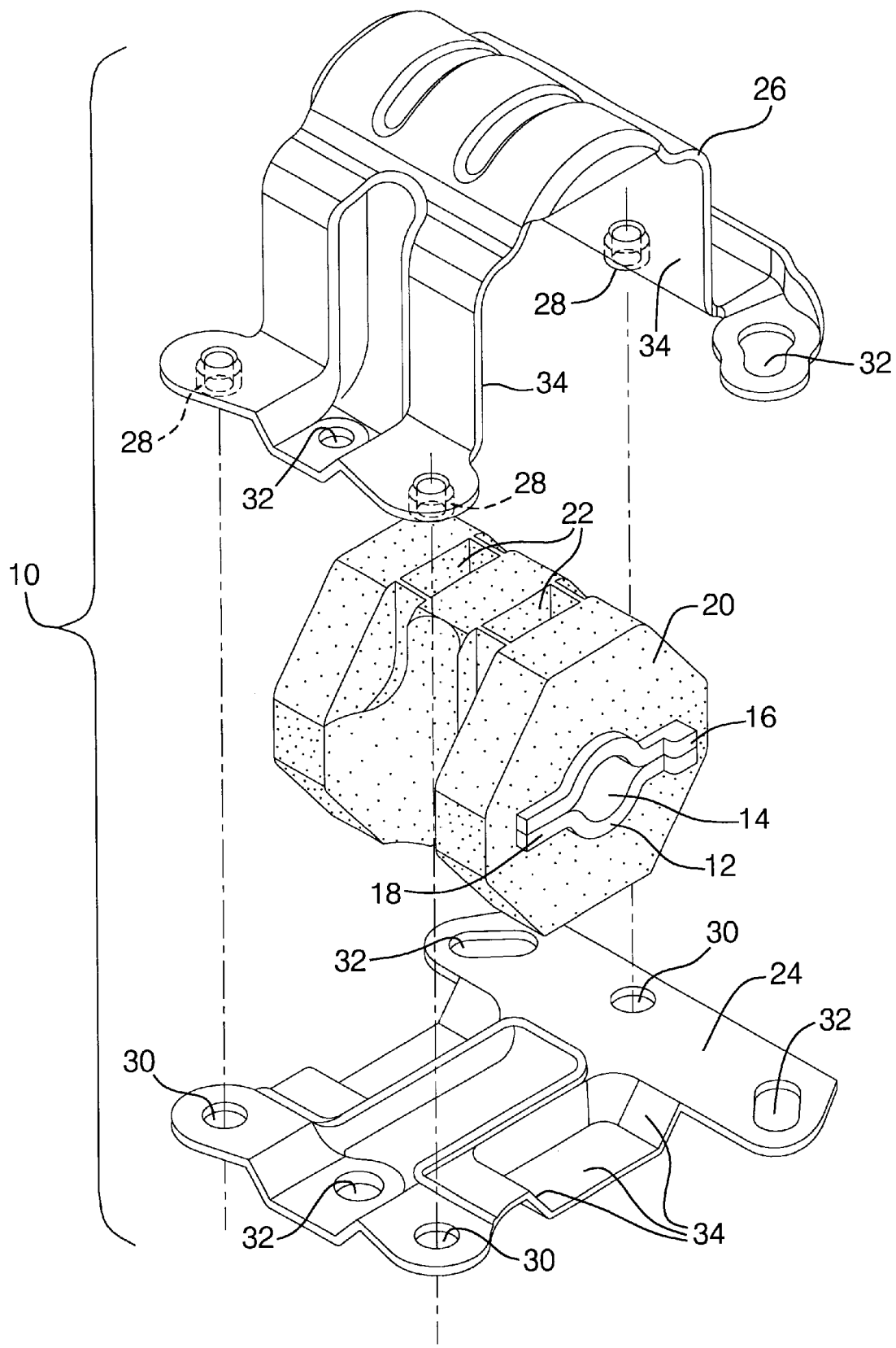
FIG. 1 is an exploded view of a product known as a pre-loaded engine mount (bushing) structure.

A practice of the invention will be illustrated in terms of the assembly of a pre-loaded engine mount part depicted in FIG. 1 in partly exploded view.

The part is termed a pre-loaded engine bushing or mount for reasons that will become apparent shortly. Engine mount 10 contains a steel center insert 12 portion that defines a cylindrical through hole 14 for the passage of a bolt or the like to facilitate attachment of the mount 10 to a chassis or other structural support member. Center insert 12 also contains lateral portions 16, 18 to limit rotation within molded natural rubber cushion member 20. As seen, the molded rubber cushion member 20 is generally cylindrical in cross section but has voided portions 22 along its length for adjustment of the spring rate and flexibility of the cushion member.

The cushion member 20 is a molded, carbon-filled natural rubber part. It is formed by first placing a center insert member (e.g., 14) into a rubber mold. The surface of the metal insert is coated with a reactive rubber-based adhesive such as Chemlok 252 of the Lord Corporation or Thixon OSN2 of Morton International. A suitable natural rubber molding compound is then introduced into a mold that has been preheated to a suitable molding and vulcanization temperature for the natural rubber composition. During the vulcanization of the rubber composition, a strong adhesive bond is formed with the reactive rubber-based adhesive, bonding the molded rubber cushion 20 to the center insert member 14. While this in situ bonding step is an integral part of the making of the pre-loaded engine mount 10, it is not a part of the present invention.

In the assembled engine mount structure, the molded rubber cushion is to be confined under pressure within complementary shaped base plate 24 and housing plate 26. These pieces are formed of carbon steel.

As shown in FIG. 1, it is seen that the housing member 26 is provided with integral rivet members 28 in the stamping of the part. The base plate 24 has holes 30 pierced in the stamping to receive the corresponding rivet members 28 from the housing 26. Both the base plate 24 and the housing 26 have coinciding holes 32 for bolts or other suitable attachment members to fasten the engine or transmission to an assembled mount structure.

Each piece is provided with an integral zinc-iron phosphate coating for corrosion resistance and to provide a base for adherence of an electrophoretically deposited, cathodic prime coat. The zinc phosphate-coated pieces are then immersed in an electrophoretic bath containing a aqueous dispersion of a cathodically-depositable epoxy resin. Such one-component epoxy resin (together with suitable pigments and the like) is formulated to contain sufficient cations to be depositable upon the zinc phosphated base plate and housing member when they are arranged as cathodes in the deposition bath. A suitable paint is Powercron 590/534 supplied by PPG. A thin adherent coating of the epoxy prime coat paint is thus formed to cover the entire surfaces of the steel pieces 24, 26. Although the epoxy paint covers the entire surfaces of both base plate 24 and housing plate 26, it is indicated at locations 34 where bonds are to be formed. The pieces are removed from the bath and baked in a paint cure oven. The baking is undertaken at a temperature of the order of 400° F. for 40 minutes or at a temperature and for a time as specified by the paint supplier to provide a suitably cured epoxy prime coat paint that satisfies suitable scratch-resistant and solvent-resistant specifications for use, for example, in the automotive environment.

In accordance with prior art practices, the internal surfaces of the primed base plate and housing member would now be coated with a suitable adhesive such as a two-part epoxy resin. However, in accordance with the practice of this invention, such adhesive is not required.

The natural rubber cushion pieces containing the molded-in insert sections are suitably chlorinated so as to provide a surface that will bond to the baked epoxy prime coat on base member 24 and housing member 26. The chlorination is carried out by immersing the molded rubber piece for five minutes in an aqueous chlorine solution prepared by dissolving three ounces per gallon of water of a 12% by weight sodium hypochlorite (NaOCl) aqueous solution. The solution is acidified to a pH2 with hydrochloric acid. The chlorinated rubber pieces were then rinsed with water. The natural rubber moieties at the surface of the molded part are thus provided with chlorine groups that are suitable for bonding in accordance with the practice of this invention.

The steel outer brackets 24, 26 are then clamped around the molded rubber cushion member 20, and the assembly is compressed so that rivet portions 28 in the housing member 26 extend through the holes 30 in the base member 24 and the rivets 28 are upset to form a secure structure within which the molded rubber piece is in compression. Although the molded rubber piece contains void portions 22, it also contains sufficient remaining surface area in contact with both base plate 24 and housing plate 26 to form a suitable bond to each bracket.

A bond is then obtained between the compressed, chlorinated surface, rubber member and the baked electrophoretically-prime coated containing members by heating the assembly 10 (or at least the bond interface region) to a temperature of the order of 300° F. Successful bonds have been formed by heating the assembly in a convection oven for 15 minutes at 330° F., removing the assembly from the oven and allowing it to cool. In other practices, the assembly has been heated very rapidly in an induction heating coil to raise the rubber cushion 20-bracket 24, 26 interfaces to temperatures of 275° F. to 300° F. and allowed to cool. Both the induction heating and convection heating practices produce good bonds. Preferably, the heating is carried out at a temperature, e.g., in the range of 275° F. to 350° F. for a period sufficient to bring the region to be bonded to such a temperature to form a bond between the compressed chlorinated natural rubber body and the baked epoxy-coated brackets. Heating in a convection oven, depending upon the mass of the assembly, may require up to 15 minutes or so. As stated, suitable focused induction heating can be much faster.

After bonding, several engine mount structures were subjected to a number of environmental test that are commonly used to predict performance on actual vehicles. The failure strength of rubber to epoxy primed bracket bonds was determined. The testing was done on mounts that had been compressed during bonding but not riveted so that the rubber-to-bracket bond strength could be determined separately for the plate piece 24 and housing piece 26. Pressure was applied, of course, to form the rubber-to-paint bond. The fact that all bonds survived the respective environmental tests with relatively little degradation of the bond supports the proposition that this form of direct bonding between rubber and basked epoxy paint is a useful bonding tool for automobile mount structures. All failure loads are reported in Newtons.

The table below reports bond strength data for four groups of six engine mount structures each that were subjected respectively to no conditioning (i.e., as formed) salt spray testing, 100% humidity testing and overaging. In each set of six mounts, three were heated in a convection oven for adhesive bonding and three were induction heated.

| CONDITIONING | CONVECTION OVEN HEATED | | INDUCTION HEATED | |
|---|---|---|---|---|
| | HOUSING LOAD | PLATE LOAD | HOUSING LOAD | PLATE LOAD |
| None | 2685 | 6170 | 1880 | 3050 |
| | 2040 | 6230 | 2080 | 2115 |
| | 1500 | 2700 | 2185 | 2625 |
| 14 Day Salt Spray | 2430 | 2044 | 1670 | 3360 |
| | 2065 | 2295 | 3160 | 4935 |
| | 2485 | 2750 | 1325 | 5555 |
| 7 Days 100% RH, 175° F. | 735 | 4235 | 1975 | 3265 |
| | 1400 | 3240 | 1775 | 3085 |
| | 3000 | 6655 | 1880 | 2930 |
| 7 Days Oven Age, 212° F. | 2260 | 4360 | 2250 | 3075 |
| | 3575 | 6220 | 2470 | 3595 |
| | 2960 | 6100 | 2405 | 3550 |

Although there is considerable variation in the housing and plate bracket failure loads, the specified requirement for the pre-loaded engine mount is only 222 Newtons. As a basis for comparison, ten mounts were made with a current production process where the Lord Company's Chemlok 828™ is used as the post-vulcanization adhesive between the chlorinated rubber and epoxy paint. Molded assemblies used were of the same design as those used above and the induction heating was done at the same time under similar conditions. These production parts were tested as bonded, no environmental conditioning. They performed at follows:

| CONDITIONING | INDUCTION HEATING USED FOR ALL PARTS | | | |
|---|---|---|---|---|
| | HOUSING LOAD | PLATE LOAD | HOUSING LOAD | PLATE LOAD |
| None | 1040 | 2375 | 2225 | 2330 |
| | 2325 | 2460 | 2340 | 1690 |
| | 2245 | 1825 | 1385 | 1985 |
| | 1465 | 2450 | 955 | 1995 |
| | 1020 | 1840 | 1820 | 2125 |

The surprising result is thus clearly seen. The chlorinated rubber bodies can be strongly bonded directly to the baked epoxy prime coat. The resultant bond is at least as strong as the bond between the same surfaces using a commercial adhesive formulated specifically for such applications.

A series of tests were then conducted to determine the effects of cure temperature of the epoxy electrocoat primer on bonding to 65 Shore A natural rubber compound with surface chlorination. Rubber bonds made by compressing 15 mm×22 mm×8 mm thick samples against an electrocoat painted (Powercron 590/534™) panel and compressing the rubber samples approximately 20%. Such assemblies were heated for 20 minutes at 310° F. These panels had been painted at least six months before bonding was attempted.

| ELECTROCOAT CURE | LOAD, PSI | COMMENTS |
|---|---|---|
| 30 min at 375° F. | 487 | Electrocoat reflowed under heat and pressure. |
|  | 210[1] | 210 psi sample failed between paint and metal. |
| 30 min at 400° F. | 411 | Electrocoat did not reflow. Microscopic examination of paint surface after testing showed tops of asperities of rubber surface bonded. "Valleys" between peaks did not bond. |
|  | 378 |  |
| 30 min at 425° F. | 488 | Electrocoat did not reflow. Microscopic examination of paint surface after testing showed tops of asperities of rubber surface bonded. "Valleys" between peaks did not bond. |
|  | 403 |  |

It is seen that a strong bond can be formed between a natural rubber body with a chlorinated surface and a baked, electrophoretically-deposited epoxy resin despite substantial variation in bake conditions.

Figure 2A:
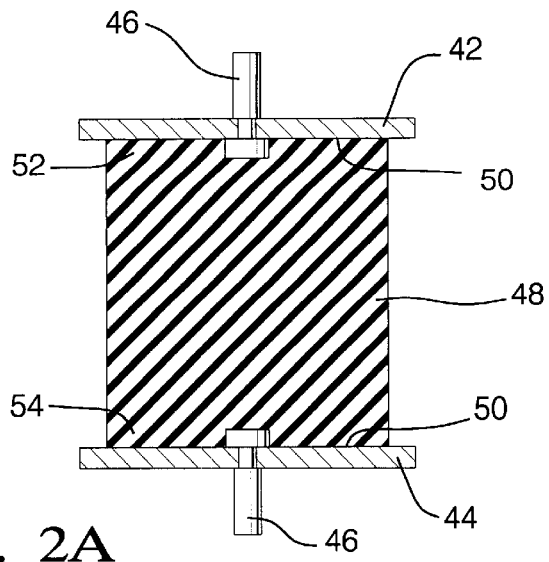
FIGS. 2A, 2B and 2C illustrate a generalized mounting structure consisting of two brackets between which is sandwiched a bulk elastomeric body.

FIG. 2 illustrates a general application of the practice of this invention. In FIG. 2A is illustrated a generalized mounting structure 40 containing a first bracket plate 42 and a second bracket plate 44, each of which has attachment means 46 for attachment to a structure to be mounted and a supporting structure. Sandwiched in between the brackets is a suitable rubber or elastomeric cushion material 48. The bracket plates may be formed of any suitable material such as steel, aluminum or a reinforced polymeric composite. In each instance, the bracket plate 42, 44 is provided on its inside surfaces with a coating (indicated at 50) of a baked epoxy, one-component paint composition. Of course, the epoxy may cover the entire surfaces of bracket members 42, 44, but its presence is required on the bonding interfaces indicated. The rubber composition 48 is then suitably treated with an acidified chlorine (NaOCl) solution as in the case of natural rubber and sandwiched between the epoxy resin-coated bracket plates. Any suitable chlorination medium for the rubber such as, for example, Lord Corporation 7701 may be used.

Figure 2B:
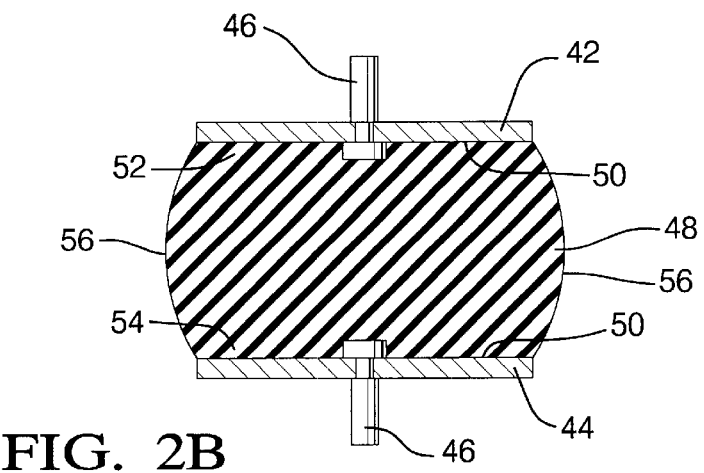
Figure 2C:
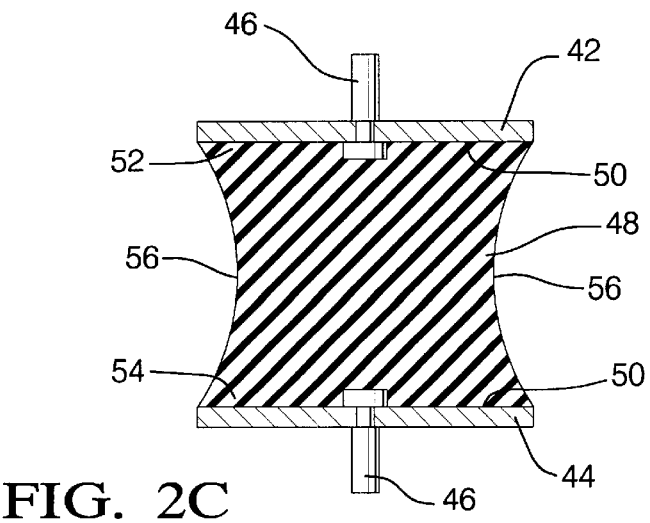

The rubber body 48 is then compressed up to 10% to 20% of its original thickness (see FIG. 2B), and the structure is heated to a temperature suitably in the range of 275° F. to 325° F. for a period of up to 15 minutes or so to enable the elastomeric member to bond to the cured epoxy composition. The configuration shown in FIG. 2B illustrates that when the rubber body 48 is compressed and bulges, its contact surfaces (upper 52, lower 54) with the brackets 42 and 44 actually increase in area. The reduction in height of body 48 causes an increase in cross-section as readily perceived at the bulge in its waist section 56. After the heating operation and bonding is completed, the pressure is released on the rubber body 48 and its waist 56 contracts as shown in FIG. 2C. However, the increased bonding area with brackets 42 and 44 remains.

Following are examples of chlorinated surface, natural rubber pieces bonded to a variety of baked, powdered epoxy paint coatings.

Use of Powdered Epoxy Paints as Adhesive

In the following rubber-epoxy paint adhesion tests, powdered epoxy paints were applied by electrostatic deposition to steel sheet substrates. Attempts were then made to bond chlorinated natural rubber pieces to the cured epoxy paint under heat (300° F. for 20 minutes) in a convection oven and pressure.

In first column, 8 mm thick rubber pads similar to previous test on E-coat was used without success. When 2 mm thick rubber pads were tested at the same compression (which results in much higher pressure due to reduced "bulge area" of the rubber pads), bonds were obtained. Powdered epoxy paints were provided by respective manufacturers and pre-cured for optimum properties.

In the 2 mm thick rubber samples where bonds were formed, tensile stress was applied to tear apart the rubber and painted sheet metal substrate. The tensile stress in psi to separate the rubber from painted substrate is reported in the right hand column of the following table.

| PAINT FILM | 8 mm thick rubber psi | 2 mm thick rubber psi |
|---|---|---|
| Morton "10-7086" | 0 | 558 |
| Sherwin-Williams "88-1046" | 0 | 115 |
| Sherwin-Williams "88-1065" | 0 | 358 |
| Herbert-O'Brien "Black Snow" | 0 | 248 |

While the above embodiments employed natural rubber (cis-1,4-polyisoprene) as the resilient elastomeric body, other rubbers such as synthetic cis-1,4-polyisoprene and neoprene are suitable in the practice of this invention. Furthermore, mixtures containing about 40 weight percent or more of such polyisoprene and/or neoprene rubbers with other synthetic rubber such as styrene-acrylonitrile rubber, ethylene propylene diene monomer (EPDM) polymers, nitrile rubber and hydrogenated nitrile rubber may also be bonded to cured epoxy coatings by the practice of this invention. When using such rubber mixtures, it is usually necessary to first chlorinate the surface of the rubber before bonding the rubber surface to the cured epoxy resin. In the case of neoprene which already contains chlorine, the chlorination step is unnecessary.

While the invention has been described in terms of certain specific embodiments thereof, it will be appreciated that other forms could readily be adapted by one skilled in the art. Accordingly, the scope of the invention is to be considered limited only by the following claims.

I claim:

1. A method of forming a bond between a first bracket member and a resilient rubber body containing at least 40 weight percent of at least one of polyisoprene rubber or neoprene in a vehicle mount comprising a first bracket member, a second bracket member and said resilient rubber body sandwiched between said bracket members, said method comprising forming on a surface of at least one of said bracket members a coating of an epoxy resin cured at least to an immobile film at room temperature, chlorinating a surface of said rubber body provided that said body does not inherently contain chlorine in the form of neoprene rubber, pressing said chlorinated surface against said epoxy resin-coated surface, and heating said rubber body and bracket to a bond-forming temperature and maintaining said pressure and temperature for a time sufficient to form said bond.

2. A method of forming a bond between a first bracket member and a resilient rubber body containing at least 40 percent by weight of polyisoprene rubber in a vehicle mount assembly comprising a first bracket member, a second bracket member and said resilient rubber body sandwiched between said bracket members, said method comprising forming on a surface of at least one of said bracket members a one-part epoxy resin paint cured at least to an immobile film at room temperature, chlorinating a surface of said rubber body, pressing said rubber body against said epoxy resin-coated surface, and heating said rubber body and bracket to a bond-forming temperature and maintaining said pressure and temperature for a time sufficient to form said bond.

3. A method of forming a bond between a first metal bracket member and a resilient rubber body containing at least 40 weight percent natural rubber in a vehicle mount assembly comprising a first metal bracket member, a second metal bracket member and said rubber body sandwiched between said bracket members, said method comprising forming on a surface of at least one of said bracket members a coating of an electrophoretically-deposited cationic epoxy resin paint baked at least to an immobile film at room temperature, chlorinating a surface of said rubber body and pressing said chlorinated surface against said epoxy resin-coated surface, and heating said rubber body and bracket to a temperature and for a time sufficient to form said bond.

4. A method of forming a bond as recited in claim 3 in which said chlorinated surface, rubber body is compressed against said resin-coated surface by attachment of said first bracket to said second bracket.

5. A method of forming a bond as recited in claim 3 where said body and bracket are heated to a temperature in the range of 275° F. to 350° F.

6. A method of forming a bond as recited in claim 4 where said body and bracket are heated to a temperature in the range of 275° F. to 350° F.

7. A method for forming a bond between a rubber body containing at least 40 percent by weight of polyisoprene rubber and a surface of a body coated with an epoxy resin cured at least to an immobile film at room temperature, said method comprising chlorinating a surface of said rubber body, pressing said chlorinated surface against said epoxy resin coated surface, and heating said rubber body and said epoxy resin coated surface to a bond-forming temperature and maintaining said pressure and temperature for a time sufficient to form said bond.

* * * * *